Aug. 18, 1936. E. EHLIN 2,051,690
TIRE CHAIN BINDER
Filed Feb. 4, 1936.
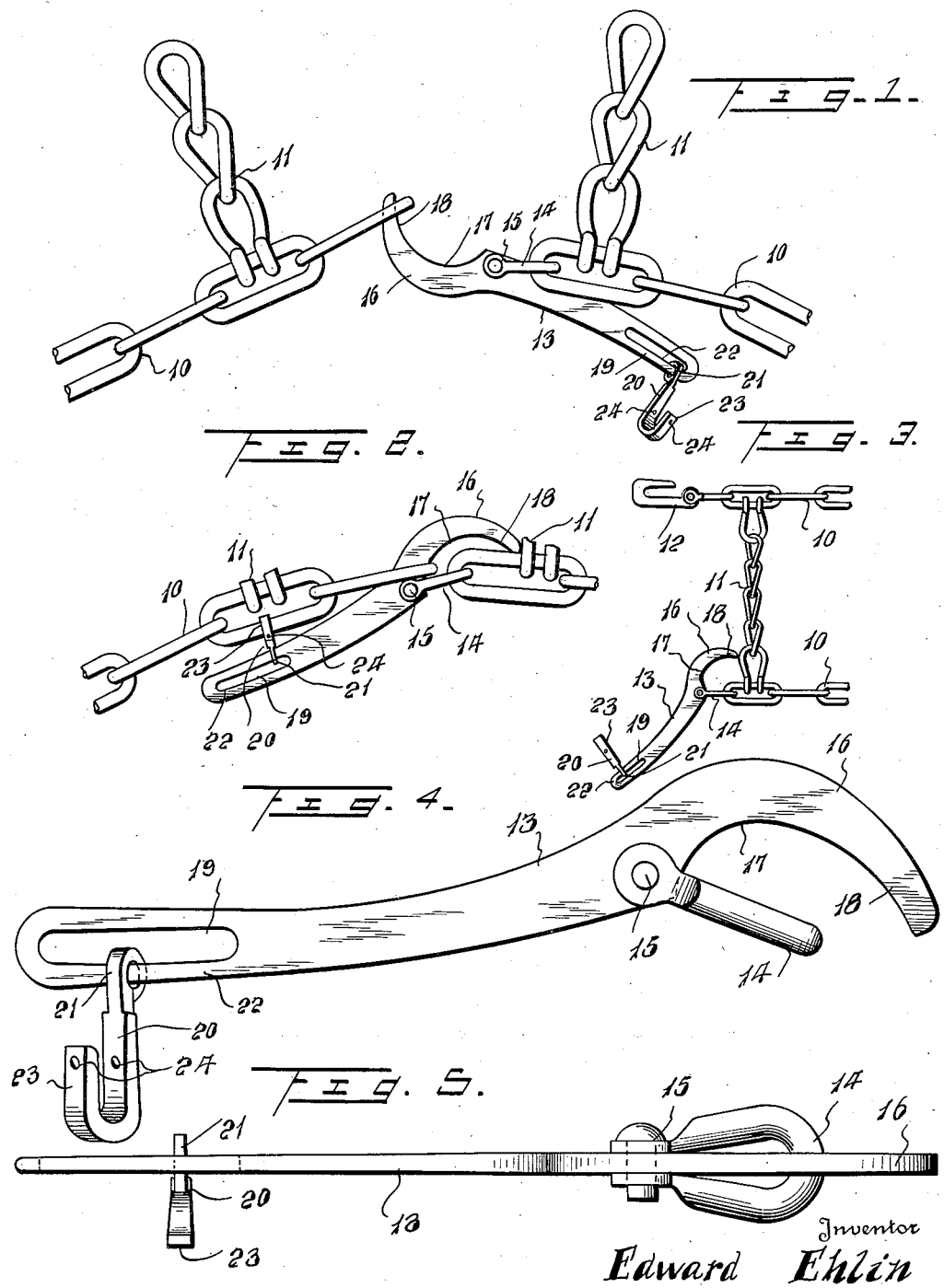
Inventor
Edward Ehlin Patented Aug. 18, 1936

2,051,690

UNITED STATES PATENT OFFICE 2,051,690

TIRE CHAIN BINDER

Edward Ehlin, Roach, Colo.

Application February 4, 1936, Serial No. 62,345

3 Claims. (Cl. 24—69)

This invention relates to a tire chain fastener or binder.

It is aimed to provide a novel binder means in the form of a lever operable to draw one side chain end toward the other side chain end and having means movable along the same to engage the side chain to hold the lever against danger of accidental displacement, and to permit the means to be moved to a position not interfered with by cross-chains.

The more specific objects and advantages will become apparent from a consideration of the description following taken in connection with accompanying drawing illustrating an operative embodiment.

Drawing:—

Figure 1 is a view showing an anti-skid tire chain fragmentarily and in side elevation, together with my improvement in the open position;

Figure 2 is a view similar to Figure 1 but showing the part in closed or locked position;

Figure 3 is a plan view of one end of an anti-skid tire chain equipped with my improvement;

Figure 4 is an enlarged side elevation of the lever or binder member and

Figure 5 is a top or plan view of such lever or binder member.

Referring specifically to the drawing wherein like reference characters designate like or similar parts, the invention is applied to an anti-skid tire chain of usual construction having a pair of parallel side chains 10, and a series of cross chains 11. In accordance with my invention, the inner side chain 10 at one terminal thereof has a hook 12 pivoted thereto which is adapted to engage or hook into the opposite terminal link of the same inner side chain.

At one terminal link of the other side chain 10, a fastener or binder lever 13 is employed which is fastened to the last mentioned terminal link by a link 14 passing loosely therethrough and pivoted as at 15 to the lever 13. This lever 13 has a hook 16 adapted to be passed through the opposite terminal link of the outer side chain to which the lever is fastened and the lever thereupon rotated or turned on the axis 15 to the locking or fastening position of Figure 2. For the best action of the hook wall with the engaged link, such hook preferably has an arcuate surface at 17 which merges into a flatter curved surface at 18.

Through the turning of the lever 13, the opposite ends of the outer side chain 10 are drawn together as shown in Figure 2, the free end of the hook 16 being located adjacent one of the side chains 11 so that the part cannot become detached.

Said binder or lever 13 adjacent end opposite to the hook as an elongated slot at 19 and a hook member 20 as an eyelet 21 slidable along a portion 22 of the lever 13 parallel to the slot. By reason of this construction, considerable adjustment and variation of the position of the hook 20 longitudinally of the lever is possible so that the free end 23 of said hook member may be engaged with any adjacent link of the chain, especially a link of the side chain. Were it not for this adjustment, it will be realized that the side chains in many instances would be in a position to render engagement of the hook 23 to the chain impracticable if not impossible.

With the parts in the position shown in Figure 2, there is minimum danger of detachment but if desired, wire or fastening may be passed through aligned openings 24 of the hook member 20.

In attaching the anti-skid chain equipped with my improvements to a wheel, the hook 12 is first engaged with the other terminal of the inner side chain at 10. Thereafter, the binder lever 13 has its hook 16 passed through the adjacent outer side chain terminal link as shown in Figure 1, following which, the lever is turned on the axis 13 to the position of Figure 2 whereupon the hook member 20 is applied to one of the chain links to prevent accidental detachment of the binder or lever.

Various changes may be resorted to provided they fall within the spirit and scope of the invention.

I claim as my invention:—

1. A means for drawing together and connecting two sections of chain comprising a lever having a hook positioned to penetrate the terminal link of one section of the chain, a link member pivoted to the lever adjacent the proximal end of the hook and terminating short of the distal end of the hook, and engaging means for a link of one of the sections of the chain remote to the terminal link, and means adjustably mounting said engaging means for movement longitudinally of the lever, said hook and said means being on opposite sides of the axis of said link member.

2. A means for drawing together and connecting two sections of chain comprising a lever having a hook to penetrate the terminal link of one section of the chain, a link member pivoted to the lever adjacent the proximal end of the hook and terminating short of the distal end of the hook, said lever having an elongated slot therethrough, said elongated slot being on the opposite side of the axis of said link member to the hook, and a chain-link engaging means adjustably mounted in said slot.

3. A means for drawing together and connecting two sections of chain comprising a lever having a hook to penetrate the terminal link of one section of the chain, a link member pivoted to the lever adjacent the proximal end of the hook and terminating short of the distal end of the hook, said lever having an elongated slot therethrough, said elongated slot being on the opposite side of the axis of said link member to the hook, and a chain-link engaging hook member adjustably mounted in said slot.

EDWARD EHLIN.